US009043641B2

(12) United States Patent
Busaba et al.

(10) Patent No.: US 9,043,641 B2
(45) Date of Patent: *May 26, 2015

(54) RECONFIGURABLE RECOVERY MODES IN HIGH AVAILABILITY PROCESSORS

(71) Applicant: International Business Machines Corporation, Armonk, NY (US)

(72) Inventors: Fadi Y. Busaba, Poughkeepsie, NY (US); Steven R. Carlough, Wappingers Falls, NY (US); Christopher A. Krygowski, Lagrangeville, NY (US); Brian R. Prasky, Wappingers Falls, NY (US); Chung-Lung K. Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 36 days.

This patent is subject to a terminal disclaimer.

(21) Appl. No.: 13/785,103

(22) Filed: Mar. 5, 2013

(65) Prior Publication Data

US 2013/0275806 A1  Oct. 17, 2013

Related U.S. Application Data

(63) Continuation of application No. 13/447,554, filed on Apr. 16, 2012.

(51) Int. Cl.
*G06F 11/00* (2006.01)
*G06F 11/14* (2006.01)
(Continued)

(52) U.S. Cl.
CPC ........ *G06F 11/1446* (2013.01); *G06F 11/1425* (2013.01); *G06F 11/0772* (2013.01);
(Continued)

(58) Field of Classification Search
CPC ............ G06F 11/0772; G06F 11/0781; G06F 11/0793; G06F 11/1425; G06F 11/1428; G06F 9/4812
See application file for complete search history.

(56) References Cited

U.S. PATENT DOCUMENTS 5,692,121 A  11/1997  Bozso et al.
6,058,491 A  5/2000  Bossen et al.
(Continued)

OTHER PUBLICATIONS

U.S. Appl. No. 13/447,554; Non-Final Office Action; Date Filed: Apr. 16, 2012; Date Mailed: May 22, 2014; pp. 1-13.
(Continued)

*Primary Examiner* — Charles Ehne
(74) *Attorney, Agent, or Firm* — Cantor Colburn LLP; Margaret McNamara

(57) ABSTRACT

A method for performing error recovery that includes creating, by a processor, a recovery checkpoint. The processor is dynamically switched into a non-recoverable processing mode of operation based on creating the software recovery checkpoint. The non-recoverable processing mode of operation is a mode in which a subset of hardware error recovery resources are powered-down or re-purposed for instruction processing. It is determined, during the non-recoverable processing mode of operation, that a new software recovery checkpoint is required. Based on the determining that a new software recovery checkpoint is required, the processor is dynamically switched into a recoverable processing mode of operation. The recoverable processing mode of operation is a mode in which hardware error recovery resources, including at least one of the hardware error recovery resources in the subset, are purposed for hardware error recovery operations.

7 Claims, 5 Drawing Sheets

(51) Int. Cl.
 *G06F 11/07* (2006.01)
 *G06F 1/32* (2006.01)
(52) U.S. Cl.
 CPC ........ *G06F11/1428* (2013.01); *G06F 11/0781* (2013.01); *G06F 1/3287* (2013.01); *G06F 11/1407* (2013.01)

(56) References Cited

U.S. PATENT DOCUMENTS

| | | | |
|---|---|---|---|
| 6,247,118 | B1 | 6/2001 | Zumkehr et al. |
| 7,827,443 | B2 | 11/2010 | Eisen et al. |
| 2006/0179207 | A1 | 8/2006 | Eisen et al. |
| 2006/0179290 | A1* | 8/2006 | Busaba et al. ............... 712/228 |
| 2006/0179346 | A1 | 8/2006 | Bishop et al. |
| 2008/0229145 | A1 | 9/2008 | Bose et al. |
| 2008/0263324 | A1 | 10/2008 | Sutardja et al. |
| 2010/0161951 | A1 | 6/2010 | Chiou et al. |
| 2011/0197097 | A1 | 8/2011 | Beaty et al. |
| 2012/0221884 | A1 | 8/2012 | Carter et al. |

OTHER PUBLICATIONS

Author Unknown; "Method to Manage Multiple Levels of Recovery in a Mainline Procedure and to Determine the Recovery Level in a Recovery Procedure"; IP.com No. IPCOM000206478D; IP.com Electronic Publication Date: Apr. 27, 2011; 7 pages.

Lee, Y-H et al., "Analysis of Backward Error Recovery for Concurrent Processes with Recovery Blocks"; IP.com No. IPCOM000128448D; Original Publication Date: Feb. 1, 1983; IP.com Electronic Publication: Sep. 16, 2001; 14 pages.

Meaney, Patrick J. et al., "IBM z990 Soft Error Detection and Recovery", IEEE Transactions on Device and Materials Reliability, vol. 5, No. 3, Sep. 2005; pp. 419-427.

Narang, Is et al., "Rolling Checkpoint in a Transaction Processing System", IP.com No. IPCOM000040510D; Original Publication Date: Nov. 1, 1987; IP.com Electronic Publication Date: Feb. 2, 2005; 3 pages.

Reick, Kevin et al., "Fault-Tolerant Design fo the IBM Power6 Microprocessor", IEEE Computer Society, Mar.-Apr. 2008, pp. 30-38.

UK International Search Report and Written Opinion for International Application No. PCT/EP2013/054696; International Filing Date: Mar. 8, 2013; Date of mailing: May 17, 2013; 8 pages.

U.S. Appl. No. 13/447,554; Notice of Allowance; Date Filed: Apr. 16, 2012; Date Mailed: Oct. 3, 2014; 9 pages.

* cited by examiner

RECONFIGURABLE RECOVERY MODES IN HIGH AVAILABILITY PROCESSORS

CROSS-REFERENCE TO RELATED APPLICATION

This application is a continuation of U.S. patent application Ser. No. 13/447,554, filed Apr. 16, 2012, the disclosure of which is incorporated by reference herein in its entirety.

BACKGROUND

The present invention relates to error recovery in high availability processors, and more specifically, exemplary embodiments of the present invention relate to error recovery systems and methods of instruction processing for high availability processors with both recoverable and non-recoverable modes of operation.

High availability computer systems necessitate both detection of hardware faults and methods to recover from the detected faults and prevent any incorrect results. In a conventional microprocessor supporting fault recovery, most fault recovery operations are hardware-specific and integrated within the microprocessor itself. Therefore, software executed on the microprocessor may run uninterrupted while lacking disruption or signaling resulting from transient hardware faults within the microprocessor hardware.

These conventional recovery mechanisms implemented in microprocessors usually discard instructions that are processed, or potentially processed, through faulty circuits, while keeping results from any chronologically older instructions that are processed prior to detecting a fault. In order to differentiate as to whether or not results of instructions are potentially faulty, results need to be buffered and/or held until associated results are checked against any potential faulty conditions before these instructions (and their results) are committed as non-faulty. If a faulty condition is detected, these potentially faulty results will need to be rolled-back, and any affected instruction will be discarded and later reissued.

In order to achieve the capabilities described above, extra pipeline resources are necessary to buffer instruction results until no faults are detected. In addition, because instructions need to be retired from a good architectural state, appropriate states (architectural and sometimes non-architectural) need to be maintained (e.g., through check-points). Such buffering, maintenance, and check-pointing increases overall circuitry required or reduces the net available resources available for instruction processing in conventional microprocessors supporting fault-recovery.

SUMMARY

According to exemplary embodiments of the present invention, a method for performing error recovery is provided. A software recovery checkpoint is created by a processor. The processor is dynamically switched into a non-recoverable processing mode of operation based on creating the software recovery checkpoint. The non-recoverable processing mode of operation is mode in which a subset of hardware error recovery resources are powered-down or re-purposed for instruction processing. It is determined, during the non-recoverable processing mode of operation, that a new software recovery checkpoint is required. Based on the determining that a new software recovery checkpoint is required, the processor is dynamically switched into a recoverable processing mode of operation. The recoverable processing mode of operation is a mode in which hardware error recovery resources, including at least one of the hardware error recovery resources in the subset, are purposed for hardware error recovery operations.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
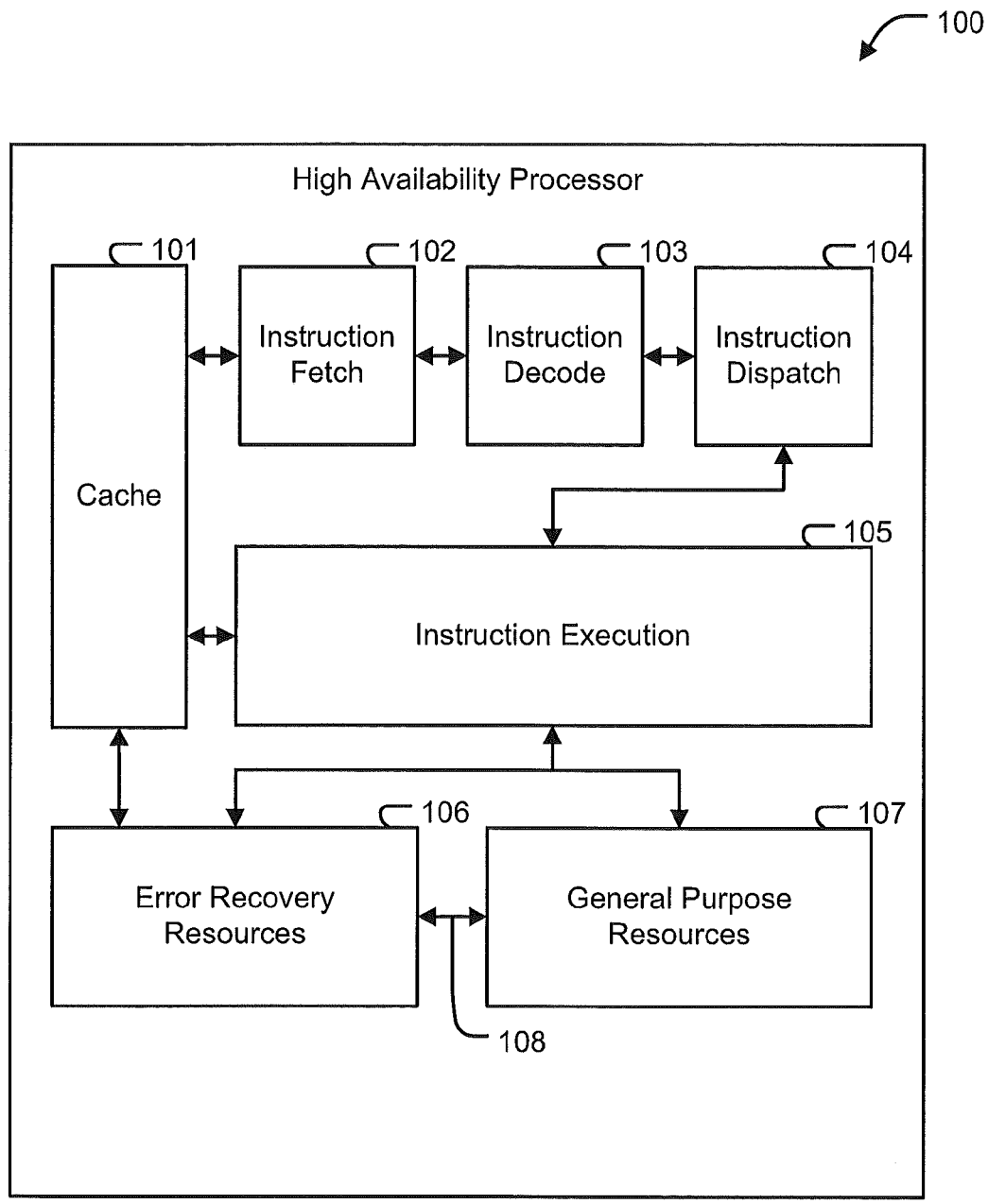
FIG. 1 illustrates a diagram of a high availability computer processor in recoverable mode, according to an exemplary embodiment of the present invention.

According to exemplary embodiments of the present invention, a high availability computer processor and method of processing instructions on a high availability processor are provided which increase resources available for instruction execution through dynamic changes to fault recovery systems available to the processor. For example, according to at least one exemplary embodiment, a high availability computer processor may dynamically switch from a fully recoverable mode into one form of non-recoverable mode which may free resources (e.g., registers, buffers, etc.) typically used for fault/error recovery for other operations. Therefore, when operating in a non-recoverable mode, the freed resources may allow increased computational throughput as compared to other computer processors (i.e., processors with only recoverable modes) while still allowing for an acceptable level of fault recovery as enabled through software-created checkpoints rather than costly hardware-specific checkpoints.

For example, a hardware mechanism may be enabled by software such that the processor dynamically configures itself to execute in either of the two modes. While in a non-recoverable mode of operation, the software may provide some coarse grain recovery mechanism, and can recover from faults using software-based checkpoint schemes, thereby allowing the same measure of fault recovery while also having freed resources from non-used hardware recovery resources. Thus, an application (or code section) may instruct the processor to go into a non-recoverable mode, and only be notified if a fault is detected. Otherwise, the processor can remain (or be switched back) into its recoverable mode.

A non-recoverable processor state has multiple benefits. The extra resources required to save a previously known good checkpoint state can be allocated for productive work. Any transient buffering states can also be reduced. For example, if part of a physical register pool is allocated to hardware checkpointing, these registers can now be used for speculative processing instead. Furthermore, additional speculative processing may be allowed to complete ahead of time before all errors are collected and a checkpoint is taken. Results can be committed before checkpointing is performed by the hardware, which is no longer required in a non-recoverable mode. Thereafter, once software enabled error recovery operations require a new software checkpoint, the processor may be directed to switch back into a recoverable mode of operation such that error recovery is hardware-facilitated while the software creates a new checkpoint. Subsequently, the processor may return to a non-recoverable mode with newly freed resources.

According to additional exemplary embodiments of the present invention, a high availability computer processor and method of processing instructions on a high availability processor are provided which decrease power consumption through dynamic changes to fault recovery systems available to the processor. For example, according to at least one exemplary embodiment, a high availability computer processor may dynamically switch from a fully recoverable mode into one form of non-recoverable mode which may free and power-down resources (e.g., registers, buffers, etc.) typically used for fault/error recovery for other operations. Therefore, when operating in a non-recoverable mode, the powered-down resources do not contribute to overall power consumption while still allowing for an acceptable level of fault recovery as enabled through software-created checkpoints rather than costly hardware-specific checkpoints.

Furthermore, the exemplary embodiments noted above may be implemented in combination such that a portion of freed resources are powered-down while another portion of freed resources are repurposed. In this manner, a plurality of operational states may become apparent where multiple benefits in computer processing are realized in contrast to existing technologies.

Turning now to FIG. 1, a high availability computer processor according to an exemplary embodiment is illustrated. As shown, the processor 100 includes a cache 101 (e.g., data and instruction cache) which may be divided into a plurality of different cache levels or designations. The processor 100 further includes instruction fetch circuitry 102 configured to fetch instructions from the cache 101. The processor 100 further includes instruction decode circuitry 103 configured to receive fetched instructions from the instruction fetch circuitry 102. The processor 100 further includes instruction dispatch circuitry 104 configured to dispatch instructions decoded through circuitry 103. Upon dispatch, the instructions are issued and executed through instruction execution portion 105, which is further configured to fetch associated data from the cache 101. Detailed handling of out of order instruction execution and support are assumed to be handled mainly inside circuitries 105.

Thus, as described above, processor 100 includes relatively common and general portions which function in an anticipated manner. These portions may be configured for reduced or complex (e.g., RISC or CISC) instruction sets or entirely specialized instruction sets according to any desired implementation of exemplary embodiments. Therefore, the processor 100 should not be limited to any specific computer processor, but should be equally applicable to any computer processor including somewhat similar or equivalent componentry.

Turning back to FIG. 1, the processor 100 further includes error recovery resources 106 in communication with the cache 101 and instruction execution portion 105. The error recovery resources 106 may include fault recovery components comprising queues, buffers, thread processing units, registers, and any other suitable components. The error recovery resources 106 may process, create, and store instructions and results for error recovery facilitation. Furthermore, the error recovery resources 106 may detect hardware faults, capture checkpoints, and perform checkpoint retry upon detection of faults.

Turning back to FIG. 1, the processor 100 further includes general purpose resources 107 in communication with the instruction execution portion 105 and the error recovery resources 106 through channel 108. The general purpose resources may include general purpose registers, floating point registers, special purpose registers, or any other suitable components for processing and storing instruction results in a controlled fashion.

Although error recovery resources 106 and general purpose resources 107 are illustrated as individual components, these resources can be distributed into other components 101, 102, 103, 104, 105 and other processor components not explicitly illustrated. Furthermore, a plurality of threads may be executed on processor 100 using both error recovery resources 106 and general purpose resources 107.

It is noted that although error recovery resources 106 and general purpose resources 107 are configured to provide different functionality, the associated components organized therein comprise at least a portion of generally the same or similar components. For example, registers and buffers may be both included in the error recovery resources 106 and the general purpose resources 107. Therefore, according to exemplary embodiments of the present invention, a portion of the error recovery resources may be freed, powered-down, or re-purposed to function in unison with the general purpose resources in at least one new operating mode. Such is illustrated in FIG. 2.

Figure 2:
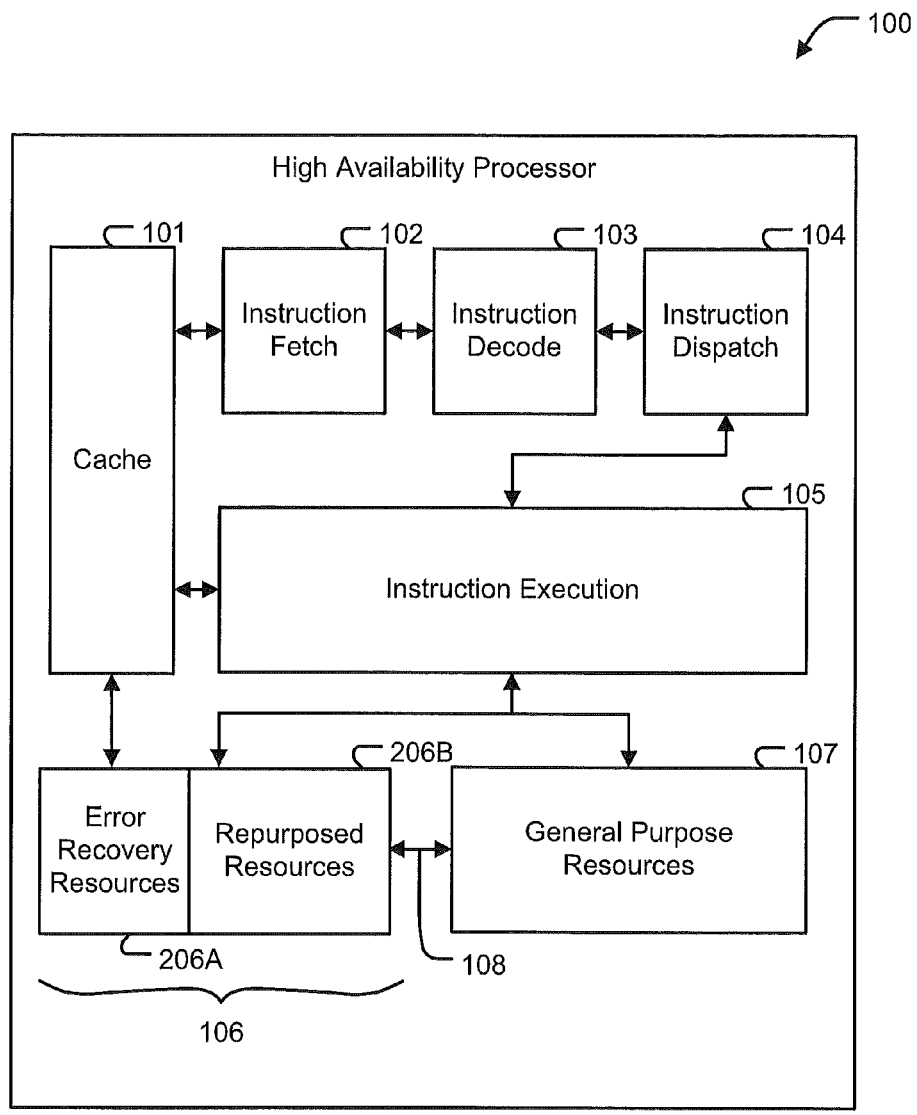
FIG. 2 illustrates a diagram of a high availability computer processor in non-recoverable mode, according to an exemplary embodiment of the present invention.

As shown in FIG. 2, a portion of error recovery resources 106 are freed and repurposed as resources 206B to function in accordance with the general purpose resources 107. Alternatively, a portion or all of resources 206B may be powered-down to lower power consumption. Further, a remaining portion of error recovery resources 206A may remain dedicated to error recovery and further be configured to free, power-down, repurpose, or reintegrate the resources 206B to function as either error recovery resources or general purpose resources within processor 100. It follows then, that if additional resources are freed for use in instruction processing, the processor 100 may operate at a faster rate than if all error recovery resources 106 are dedicated to handle hardware fault recovery. Moreover, if a portion of the additional resources are powered-down, power savings may be realized. It is noted that the processor 100 still detects hardware faults and reports them to the operating system or application code. However, the checkpoint capturing and retry mechanisms are disabled in the hardware and, instead, are performed by software.

In this configuration, the processor changes its basic operation and does not allocate resources for saving checkpoints nor does it postpone instruction execution or completion that might have to wait until the creation and validation of checkpoints. Such a configuration change may be accomplished by modifying the typical instruction dispatch/issue/execution rules of precedence, storage update ordering, and register mapping algorithms. Under such non-recoverable mode operation, many fine-grained instruction processing performance improvements and power savings can be obtained.

Furthermore, according to exemplary embodiments of the present invention, a method of instruction processing has been provided which provides a template for instruction processing which both increases computational efficiency while retaining a useful system level error recovery mechanism which distributes fault recovery obligations across software and hardware to make more efficient use of system resources.

Figure 3:
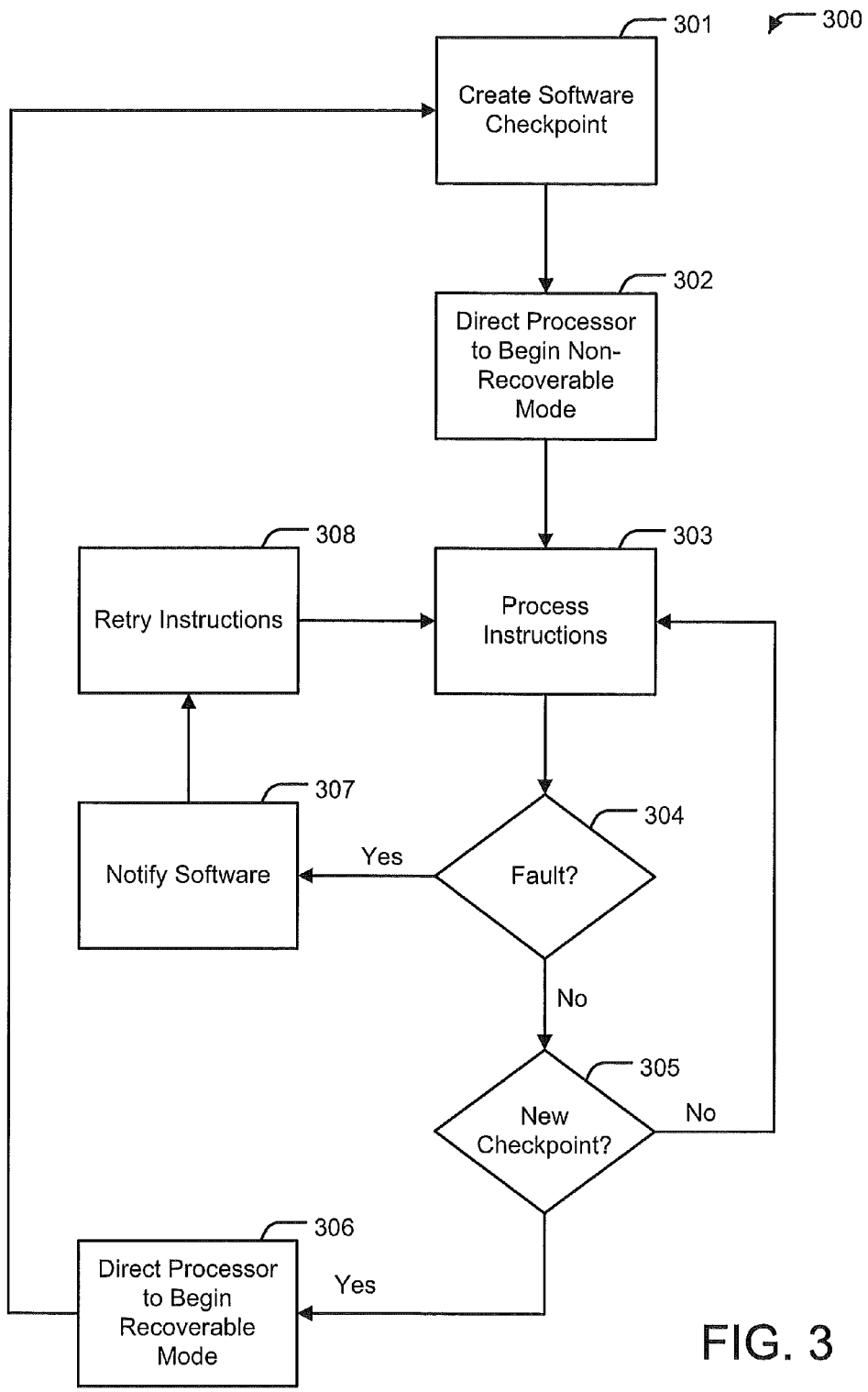
FIG. 3 illustrates a flow chart of a method of processing instructions in a high availability computer processor with non-recoverable mode support, according to an exemplary embodiment of the present invention.

Turning to FIG. 3, a method of instruction processing in a high availability computer processor is illustrated. The method 300 includes creating a software checkpoint at block 301. Creating the software checkpoint may include creating a software-based error-recovery checkpoint that enables both software error recovery and hardware error recovery for instructions executed by a high availability processor.

Upon creation of the checkpoint, the method 300 includes directing the high availability computer processor to enter or begin processing in a non-recoverable mode at block 302. Thus, the processor will switch itself into non-recoverable mode to gain extra performance or power savings. Directing the processor may include inserting an instruction such as "start non-recoverable mode" into the software program. The instruction may be embodied as a simple command, op-code, or instruction which, if fetched and decoded during normal processor operation, directs the processor to enter the non-recoverable mode of operation. Such an instruction may be embodied to have a data value stored in a particular portion of cache or memory, which upon access as part of processing the instruction, direct the error recovery resources 106 to free, power-down, or repurpose at least a portion of resources 206B. Alternatively, the instruction may be embodied with a set of bit flags or other additional directives controllable by software to more directly control resource freeing. Upon executing the instruction, the processor will checkpoint all instructions prior and switch itself into a new operating policy to operate in a performance-focused or power-saving mode; and no longer support hardware checkpoint recovery. Thereafter, the processor 100 may process instructions using the newly freed resources 206B and/or general purpose resources 107 at block 303. Alternatively or in combination, the processor may process instructions with general purpose resources 107 while at least a portion of resources 206B are powered-down. If a fault is detected by error recovery resources 206A at block 304, a flag, value, or other means for notification may be set at block 307, and instructions may be retried by the software at block 308 using its software checkpoint. The notification may be done by interrupting the current instruction stream, and the processor can post a special interrupt into the software code. If interrupt handling is not applicable or desirable, the processor may alternatively jump into a pre-specified instruction address. Such an instruction address may be a fixed location in storage, or can be specified as an operand address of the "start non-recoverable mode" instruction, for example. Otherwise, processing may continue in the non-recoverable mode until a new software checkpoint is necessary. This determination is done for software-based error recovery (e.g., see block 305).

It should be appreciated that while operating in the non-recoverable mode, any instructions whose dispatch/issue rule typically require (e.g., if executed in recoverable mode) to be next to be checkpointed may now execute at earlier time. Furthermore, physical register pool (general registers/GPRs, floating point registers/FPRs, condition code registers/CCRs, etc.) resources that would have been needed and reserved for hardware-based checkpoint retry can now be allocated for instruction processing. Furthermore, cache updates due to storage updating instructions (e.g., as in a simple store instruction) can be updated without waiting for instruction checkpointing. Thus, increased processing efficiency can be realized.

Thereafter, if software is ready to take another checkpoint as determined at block 305, another special instruction may be issued to direct the processor to enter or begin processing in recoverable mode at block 306. Thus, the processor will switch itself into recoverable mode to again begin the support for potential hardware-specific fault recovery. Directing the processor may include issuing a special instruction such as "end non-recoverable mode." The instruction may be embodied as a simple command, op-code, or instruction which, if fetched and decoded during normal processor operation, directs the processor to enter recoverable mode of operation. Such an instruction may be embodied to have a data value stored in a particular portion of cache or memory, which upon access as part of processing the instruction, direct the repurposed and/or powered-down resources 206B to be purposed as error recovery resources. Alternatively, the instruction may be embodied with a set of bit flags or other additional directives controllable by software to more directly control resource freeing. Upon executing the special instruction, the processor may check that all prior instructions are completed, and then switch itself back into the recoverable mode; and again support hardware checkpoint recovery as described above.

Figure 4:
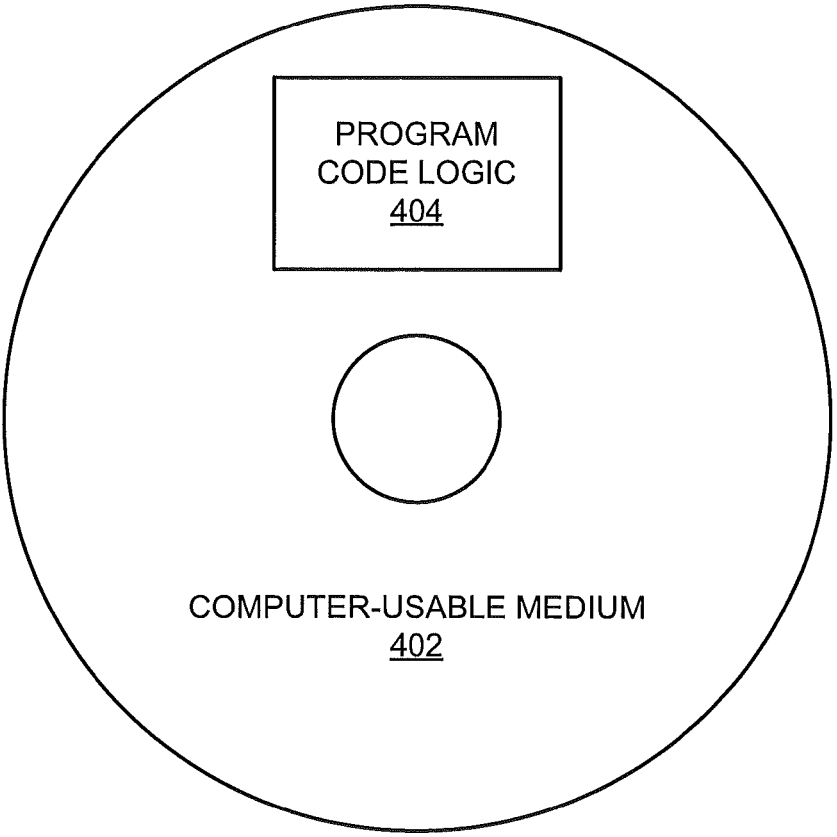
FIG. 4 illustrates a computer-usable storage medium, according to an exemplary embodiment of the present invention.

As will be appreciated by one skilled in the art, aspects of the present invention may be embodied as a system, method or computer program product (e.g., as illustrated in FIG. 4). Furthermore, aspects of the present invention may take the form of a computer program product 400 embodied in one or more computer readable medium(s) 402 having computer readable program code 404 embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 5:
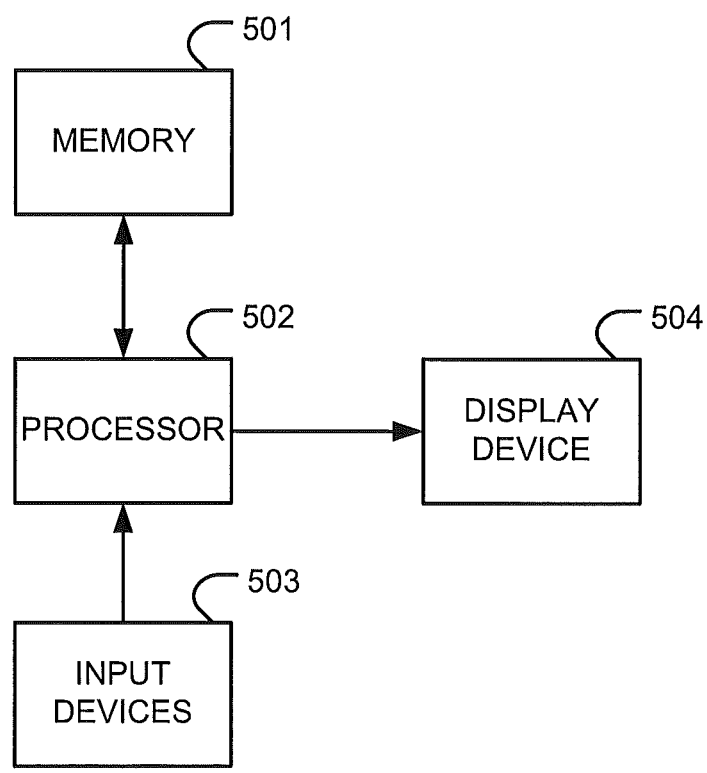
FIG. 5 illustrates a diagram of a computer apparatus, according to an exemplary embodiment of the present invention.

These computer program instructions may also be stored in a computer readable medium that can direct a computer apparatus (e.g., as illustrated in FIG. 5), other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As noted above, the methodologies described hereinbefore may be implemented by a computer system or apparatus. For example, FIG. 5 illustrates a computer apparatus, according to an exemplary embodiment. Therefore, portions or the entirety of the methodologies described herein may be executed as instructions in a processor 502 of the computer system 500. The computer system 500 includes memory 501 for storage of instructions and information, input device(s) 503 for computer communication, and display device 504. Thus, the present invention may be implemented, in software, for example, as any suitable computer program on a computer system somewhat similar to computer system 500.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for error recovery, the method comprising:
creating, by a processor, a software recovery checkpoint;
dynamically switching, by the processor, into a non-recoverable processing mode of operation based on creating the software recovery checkpoint, the non-recoverable processing mode of operation being a mode in which a subset of hardware error recovery resources are powered-down or re-purposed for instruction processing;

determining, during the non-recoverable processing mode of operation, that a new software recovery checkpoint is required; and based on the determining that a new software recovery checkpoint is required, dynamically switching, by the processor, into a recoverable processing mode of operation, the recoverable processing mode of operation being a mode in which hardware error recovery resources, including at least one of the hardware error recovery resources in the subset, are purposed for hardware error recovery operations.

2. The method of claim 1, further comprising:

determining, through the hardware error recovery resources, that a transient fault has occurred; and notifying software of the transient fault.

3. The method of claim 2, further comprising:
based on the determining that a transient fault has occurred, retrying prior instructions based on the software recovery checkpoint.

4. The method of claim 1, further comprising receiving a specialized instruction, wherein the dynamically switching into a non-recoverable processing mode of operation is further based on the receiving a specialized instruction.

5. The method of claim 4, wherein the specialized instruction is an operational code detectable by the hardware error recovery resources.

6. The method of claim 4, wherein the specialized instruction commits a non-recovery mode flag value to a reserved portion of memory address space monitored by the hardware error recovery resources.

7. The method of claim 1, further comprising receiving a second specialized instruction, wherein the determining that a new software recovery checkpoint is required is based on the receiving a second specialized instruction.

* * * * *